United States Patent [19]
Gostling

[11] 3,879,143
[45] Apr. 22, 1975

[54] SCAFFOLD AND LIKE STRUCTURES
[75] Inventor: Peter Eric Gostling, Sutton Coldfield, England
[73] Assignee: C. Evans & Sons Limited, Gants Hill, Ilford, Essex, England
[22] Filed: Oct. 10, 1973
[21] Appl. No.: 405,090

[30] Foreign Application Priority Data
Oct. 13, 1972 United Kingdom............. 47336/72

[52] U.S. Cl. ................. 403/49; 403/245; 403/256; 403/179
[51] Int. Cl. .......................... E04G 7/00; F16B 7/00
[58] Field of Search ............ 403/49, 199, 187, 241, 403/245, 256; 182/179

[56] References Cited
UNITED STATES PATENTS
| | | | |
|---|---|---|---|
| 1,674,734 | 6/1928 | Maynes............................. | 182/179 |
| 3,179,212 | 4/1965 | Gostling............................ | 403/49 |
| 3,273,921 | 9/1966 | Young et al. ..................... | 403/49 |
| 3,300,236 | 1/1967 | Sauls................................. | 403/49 |
| 3,420,557 | 1/1969 | Francis et al. .................... | 182/179 |

Primary Examiner—Werner H. Schroeder
Attorney, Agent, or Firm—Melville, Strasser, Foster & Hoffman

[57] ABSTRACT

A connector assembly for use in builders scaffolding comprising a channel-shaped element adapted to be fixed to an upright support member, a hook element adapted to be fixed to a cross member and to enter into engagement with said channel-shaped member, and a wedge member mounted on said hook element to retain said hook element in engagement with said channel-shaped element. Said wedge member is captive in said hook element and the free end of said hook element, in its position of use, is spaced from said upright support member.

8 Claims, 6 Drawing Figures

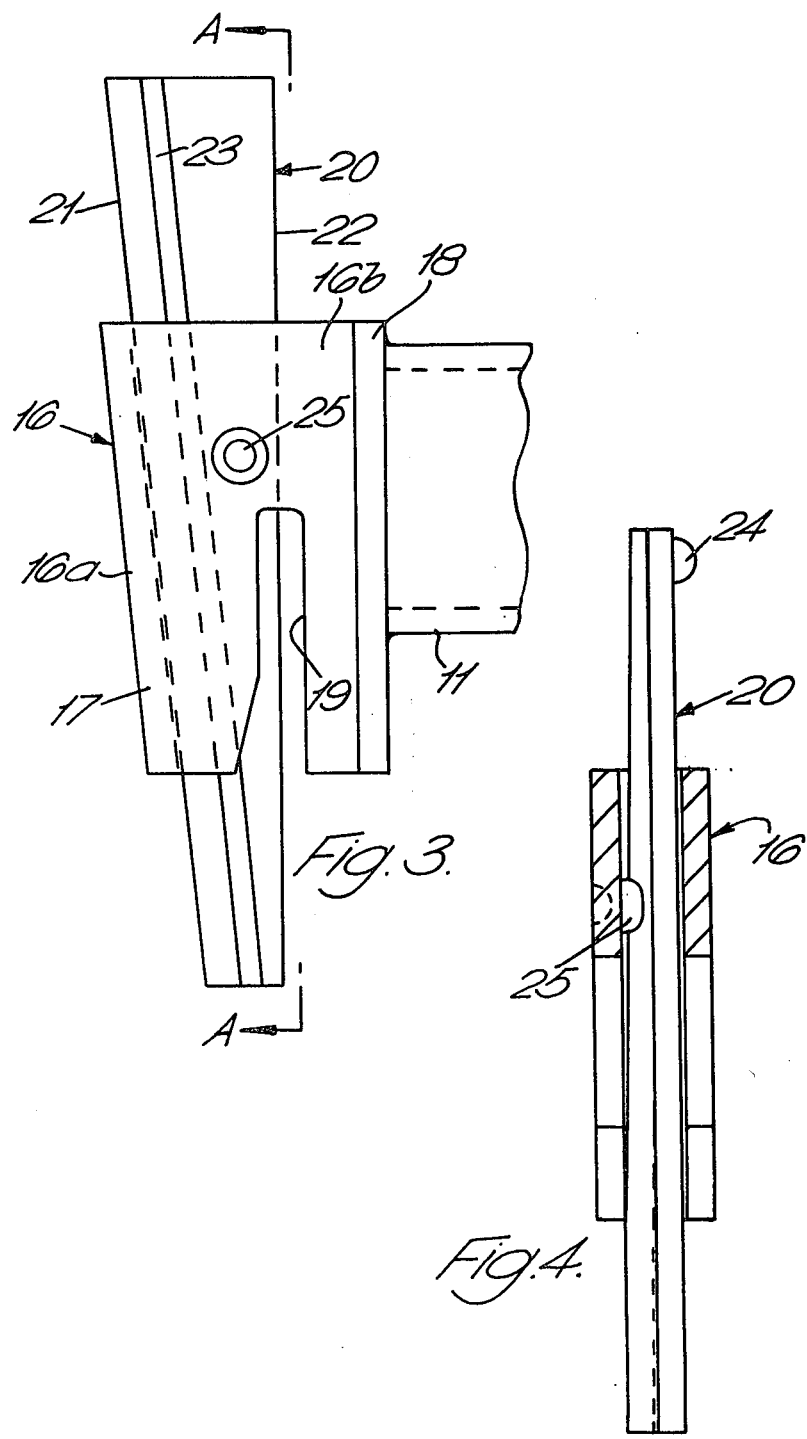

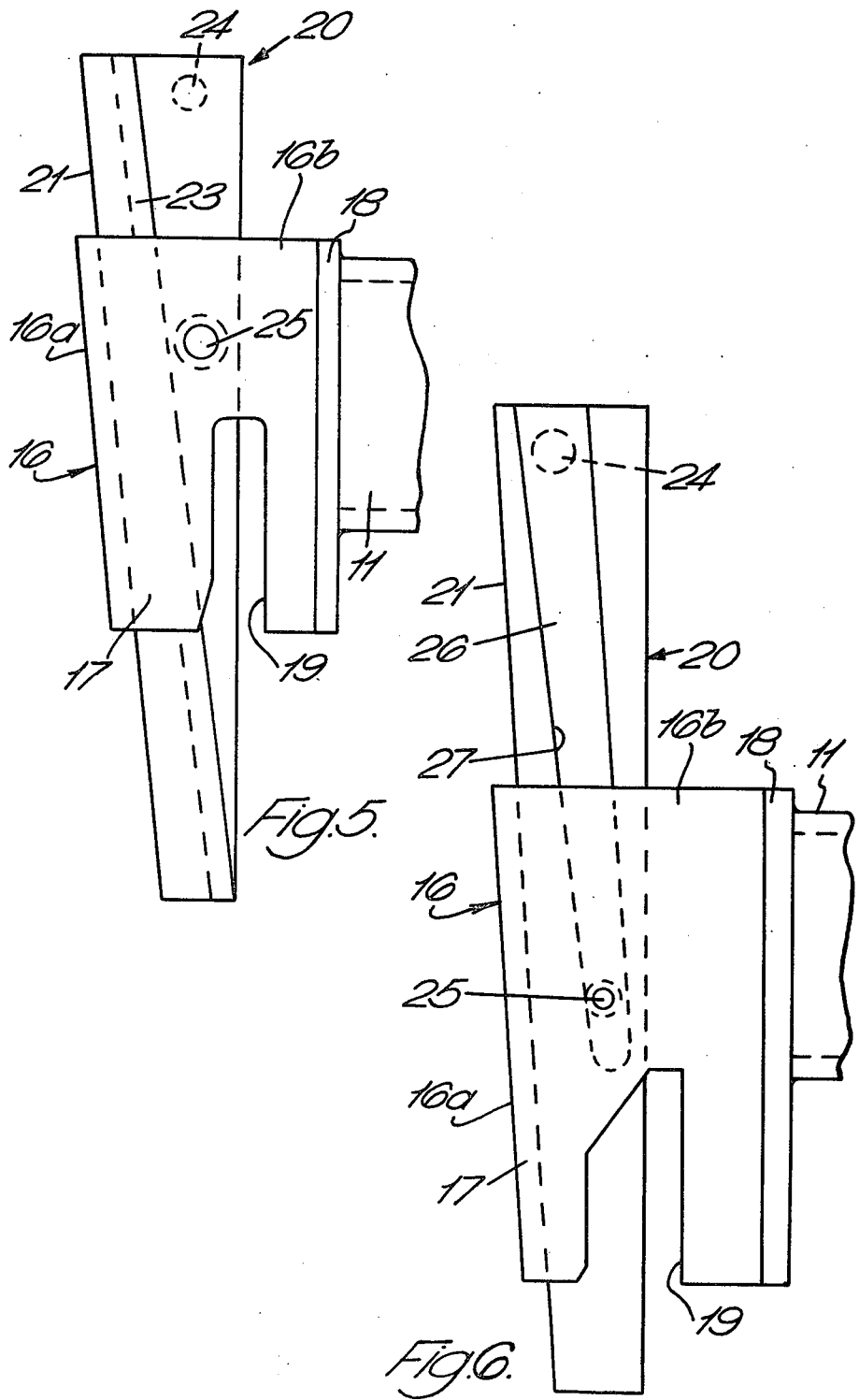

SCAFFOLD AND LIKE STRUCTURES

This invention relates generally to builders scaffolding of the kind comprising upright supports or standards and cross members which are interconnected to form a rigid structure. The term "cross members" includes horizontally extending ledgers, horizontally extending transoms, diagonal and other bracing members, and other members such as outrigger brackets which extend transversely to the upright supports or standards, and which are adapted to connect together, or be connected to, the upright supports or standards.

The present invention is concerned with a connector assembly for interconnecting the cross members with standards in scaffolding of the aforementioned kind.

the term "builders scaffolding" is intended to include scaffolding for access purposes where the standards are of one diameter, and also to cover scaffolding for propping purposes where the standards or other upright supports such as puncheon members are of the same, or of a different, diameter as that used for access scaffolding.

It is of course known to provide, in builders scaffolding of the aforementioned type, a connector assembly consisting of a channel-shaped element fixed to an upright support member, and a so-called hook element having operatively associated therewith a wedge member, the hook element being fixed to a cross member and being arranged to enter into engagement with the channel-shaped element.

In one such assembly, the so-called hook element has a vertical face which has to be in contact with the surface of the upright support member and therefore this assembly has the disadvantage that the cross members can be used only with upright support members of one diameter and are not therefore interchangeable for use with upright support members or different diameters.

In another such assembly, the so-called hook elements are of a complicated nature and are such that they only rest on the channel-shaped element and rely almost wholly on the wedge member for providing a proper connection, and for providing rigidity in the structure in which they are used. This assembly therefore has the disadvantage that it is difficult to manufacture, and the further disadvantage that it is lacking in rigidity. Furthermore, in this assembly, the end of the so-called hook element is practically touching the upright support member and therefore, as in the previous example, the cross members to which the hook element is fixed are not interchangeable for use with upright support members having different diameters.

In a still further known connector assembly, the so-called hook element does not wholly embrace the channel-shaped element and therefore the wedge member is arranged to engage an external surface of the channel-shaped element in order to provide the necessary rigidity. This arrangement is not satisfactory in that the rigidity of the structure suffers, especially during the construction thereof. Furthermore, as in the case of the previous prior art assemblies, the nose of the hook element is, of necessity, close to the surface of the upright support member and therefore the cross members to which the hook elements are fixed, are not interchangeable for use with upright support members having different diameters.

In all of the prior assemblies hereinbefore referred to, the cost of manufacture is relatively high and, especially in the case of the hook elements, they are prone to damage due to their bulky nature.

It is among the objects of the present invention to provide an improved connector assembly which avoids, or substantially avoids, the aforementioned disadvantages, and which is of simple and robust construction whilst being such as to provide a more rigid structure than known connector assemblies for this purpose. To this end it is also an object to provide an assembly which is less bulky and therefore less costly to produce.

It is further among the objects of the present invention to provide a connector assembly which enables standard length cross members to be used with different diameter upright support members whilst maintaining the same centre-to-centre spacing of the upright support members.

According to the present invention, there is provided a connector assembly for builders scaffolding of the kind hereinbefore referred to, which comprises a channel-shaped element provided to be fixed to an upright support member with the base wall thereof being spaced from the peripheral surface of the support member, a hook element provided to be fixed to a cross member and formed to define a slot having a closed end to receive the base wall of the channel-shaped element, and a wedge member mounted on the hook element and positioned so that, in use, it is within the channel-shaped element and is operable to urge the wall of the slot remote from the support member firmly into engagement with the surface of the base wall of the channel-shaped element remote from the support member, the arrangement being such that the free end of the hook element is spaced from the periphery of the support member.

One example of a connector assembly in accordance with the invention will now be described with reference to the accompanying drawings in which:

FIG. 3 is a side elevation of one part of the assembly,

FIG. 4 is a sectional end elevation on the line A–A of FIG. 3, and

FIGS. 5 and 6 are views similar to FIG. 3 showing modifications.

Figure 1:
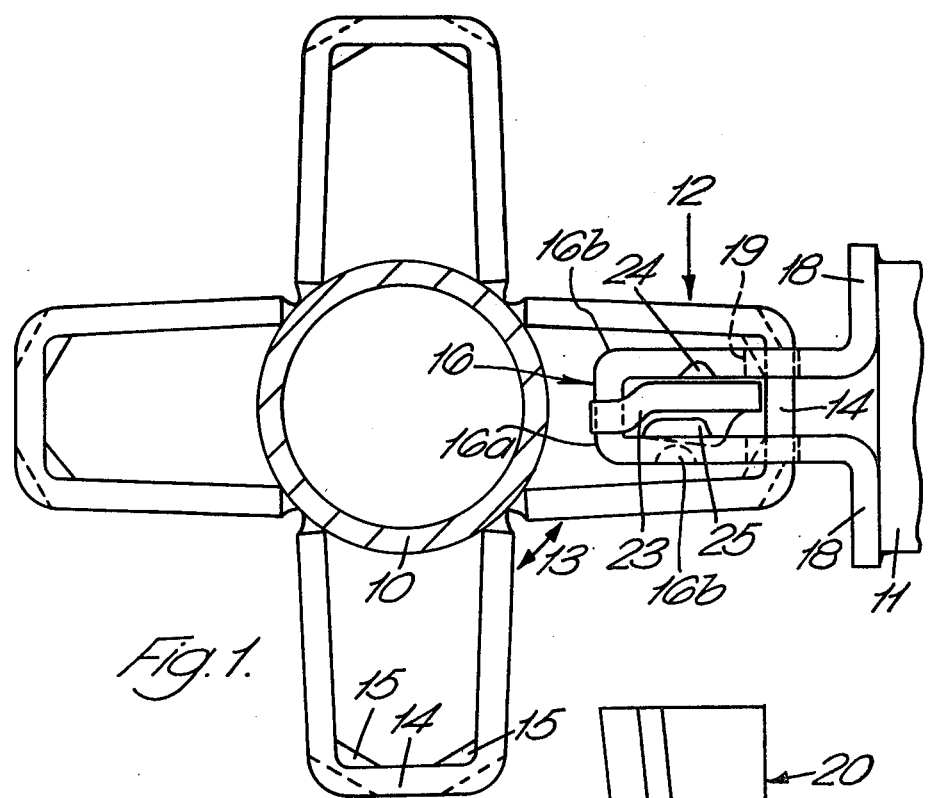
FIG. 1 is a sectional plan view of the assembly.

Referring to the drawings, there is shown a tubular upright support member 10 which, in use, will form one of the tubular support members of a scaffold structure. Also shown is a tubular cross member 11 which, in use, will form one of the horizontal members of the structure. Whilst the cross member 11 is shown as being tubular, it will be understood that it can be of any other section, for instance, inverted T-section so that it can provide support for planks. The members 10 and 11 are inter-connected by a connector assembly 12.

The assembly 12 comprises two components fixed to the members 10 and 11 respectively, the component on the member 10 comprising a channel-shaped element 13 having its base wall 14 disposed parallel to the axis of the member 10. As shown in FIG. 1, four such channel-shaped elements 13 are provided spaced about the support member 10. The channel-shaped elements 13 are welded to the member 10 and, intermediate their ends, gussets 15 are formed between the side walls and the base wall 14. The gussets 15 provide added strength to the members 13 and conveniently are formed by a pressing operation.

The component which is secured to the cross member 11 is referred to as a hook member 16 and includes a hook portion 17 which, in use, is accommodated within the channel-shaped element 13. The hook member 16 is formed as a channel having side walls 16b the ends of which are outwardly turned and define wings 18 which are secured to the member 11 by welding. The plane of the wings 18, and thus of the ends of the side walls 16b, lies perpendicular to the end edges of the member 16. The base wall 16a of the channel is inclined relative to the plane of the wings 18 and the width of the channel, measured between the outer surfaces of the walls 16b thereof, is less than the internal width of the channel-shaped element 13.

Formed in the walls 16b of the channel 16 are aligned slots 19. The slots 19 extend upwardly from the lower and narrower end edge of the channel 16 and the surfaces of the slots 19 which are nearer to the member 11 are disposed substantially parallel to the plane of the wings 18. The width of the slots 19 is greater than the thickness of the base wall 14 of the channel-shaped element 13 and the lower portions of the surfaces of the slots remote from the member 11 flare outwardly to facilitate inter-engagement of the two components.

The hook element 16 mounts a wedge 20 having wedging surfaces 21, 22 for co-operation with the base wall 16a of the channel 16 and the base wall 14 of the channel-shaped element 13 respectively. When the hook member 16 is engaged with the channel element 13, the wedge 20 is tapped in a downward direction towards its operative position and the effect of this is to draw the surfaces of the slots 19 nearest to the member 11 into firm engagement with the outer surface of the base wall 14 of the channel element 13 and thereby, the support member 10 and cross member 11 are held in engagement with each other.

The thickness of the plate from which the wedge 20 is formed is less than the distance between the inner surfaces of the side walls of the channel 16. However, as seen in FIGS. 1 and 4, the wedge member 20 is joggled or cranked to provide an intermediate longitudinal bend indicated at 23. The line of the bend 23 extends parallel to the surface 21 but, as seen in FIG. 4, the overall thickness of the wedge is less at its upper end than at its lower end. The effect of this is that the wedge 20 can be retained in its upper or inoperative position by interference with the inner surfaces of the side walls of the channel 16. The wedge is prevented from falling out of the channel by a projection 24 at the upper end thereof, and the wedge is guided in its movement by means of a projection 25 extending inwardly from one of the side walls 16b of the channel 16, the projection 25 co-operating with the surface defined by the intermediate bend 23.

With reference to FIG. 5, the wedge 20 has a uniform overall thickness throughout its length, but in order to provide for retention of the wedge in the upper or inoperative position, the line of the intermediate bend 23 is disposed at an angle to the surface 21, the distance between the line and surface being greatest at the bottom of the wedge. The projection 25 is again provided and serves to locate the wedge but, in addition, as the wedge is driven upwardly, the projection engages with the surface defined by the bend 23 and a wedging action is created which retains the wedge in its upper or inoperative position.

A modified form of wedge 20 is seen in FIG. 6. In this arrangement the wedge 20 is provided with a dished zone 26 which is produced by a pressing operation. The boundary edge 27 of the dished zone is inclined relative to the surface 21 of the wedge so that, when the wedge is moved upwardly, the projection 25 will move into wedging engagement with the edge 27 thereby to retain the wedge in its upper inoperative position. The projection 24 is again provided to prevent the wedge falling from the hook member 16.

Figure 2:
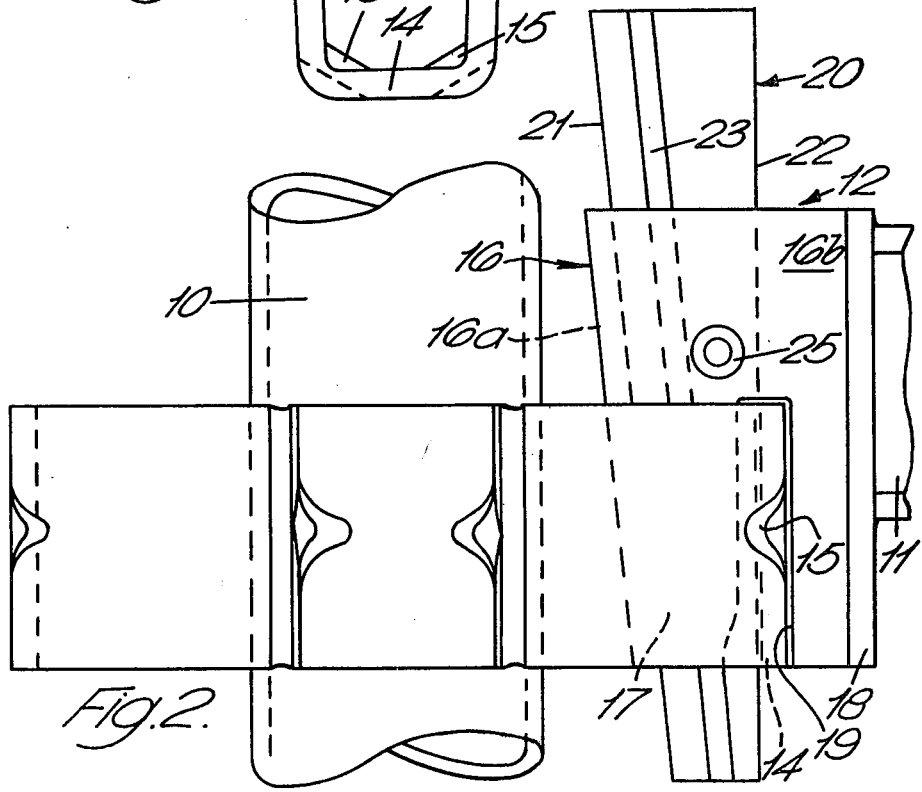
FIG. 2 is a corresponding side elevation of the assembly.

It will be clearly seen from FIGS. 1 and 2 of the drawings that the base wall 16a of the hook element 16 is spaced from the periphery of the upright support member 10. It will be realized that this spacing, and thus the depth of the channel-shaped element 12, will vary according to the diameter of the support member 10. Thus, by positioning the base wall of the element 12 a pre-determined distance from the longitudinal axis of the support member 10, support members 10 of different diameters can be used together without changing the centre-to-centre spacing thereof. This has the advantage that, where necessary, two or more sizes of support member can be used in the same structure since the cross members 11 are usable with all sizes of support member.

In addition, smaller diameter support members 10 can be used in continuation of larger diameter support members by telescoping the former into the latter, again using standard length cross members for both sizes of support member.

The wedge member 20 is the subject of co-pending U.S. Pat. Application No. 404,995 filed Oct. 10, 1973, which is divided out of the present Application.

What I claim is:

1. A connector assembly for use in interconnecting cross members with upright support members in builders scaffolding, said assembly comprising a channel-shaped element having a base wall and side walls provided to be fixed to one of said upright support members with said base wall being spaced from the peripheral surface of said support member, a hook element provided to be fixed to one of said cross members and formed with a slot having a closed end to receive said base wall of said channel-shaped element, and a wedge member mounted on said hook element and positioned so that, in use, it is within said channel-shaped element and is operable to urge the wall of said slot remote from said support member firmly into engagement with the surface of said base wall of said channel-shaped element remote from said support member, the arrangement being such that the free end of said hook element is spaced from the peripheral surface of said support member.

2. An assembly as claimed in claim 1, in which the distance between the longitudinal axis of said support member and the base wall of said channel-shaped element is the same irrespective of the diameter of said support member.

3. An assembly as claimed in claim 2, in which said wall of said slot remote from said support member lies parallel with said base wall of said channel-shaped element of said support member.

4. An assembly as claimed in claim 1, in which said hook member is in the form of a channel having side walls and a base wall, said side walls being formed with aligned openings defining said slot.

5. An assembly as claimed in claim 4, in which the free ends of said side walls of said channel are formed with outwardly extending wing portions said hook element being fixed to said cross member by means of said wing portions.

6. An assembly as claimed in claim 5, in which said base wall of said channel is inclined relative to the plane of said wing portions.

7. An assembly as claimed in claim 6, in which said wedge member is positioned within said channel and is formed with relatively inclined surfaces to co-act with said base wall of said channel-shaped element and with said inclined base wall of said channel.

8. An assembly as claimed in claim 7, in which said wedge member is formed with means which co-act with said hook element to cause said wedge member to be retained in an inoperative position.

* * * * *